No. 818,087. PATENTED APR. 17, 1906.
T. HARRIS.
STUD, DRESS FASTENER, AND THE LIKE.
APPLICATION FILED NOV. 7, 1905.

Witnesses
Anne B. Johnson

Inventor
Thomas Harris
By Johnson & Johnson
Attorneys

UNITED STATES PATENT OFFICE.

THOMAS HARRIS, OF HANDSWORTH, NEAR BIRMINGHAM, ENGLAND, ASSIGNOR TO CHARLES H. COLLINS & SONS, OF BIRMINGHAM, ENGLAND.

STUD, DRESS-FASTENER, AND THE LIKE.

No. 818,087. Specification of Letters Patent. Patented April 17, 1906.

Application filed November 7, 1905. Serial No. 286,178.

*To all whom it may concern:*

Be it known that I, THOMAS HARRIS, a subject of the King of Great Britain, residing at No. 12 Douglas road, Handsworth, in the county of Stafford, England, have invented certain new and useful Improvements in Studs, Dress-Fasteners, and the Like, of which the following is a specification.

This invention relates to improvements in studs, solitaires, bracelets, necklets, dress-fasteners, glove-fasteners, and the like, and refers particularly to that form of fastener which is in two parts, which parts when connected form the complete fastener.

The object of the invention is to make such connection of the parts that it is practically impossible to detach one from the other by accident and that when once locked together they form a secure fastener, which method of locking shall not involve the use of spring function to effect and to maintain such locked engagement.

In order to clearly describe my invention, I append a sheet of drawings showing this invention in the form of a stud.

Figure 1:
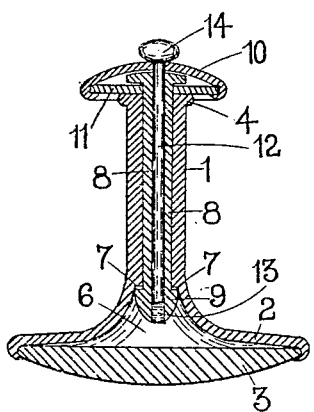
Figure 2:
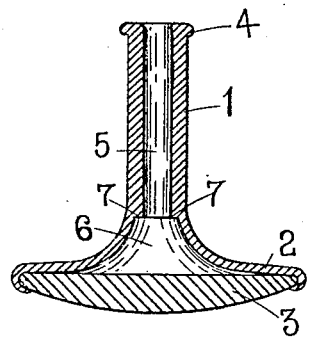
Figure 3:
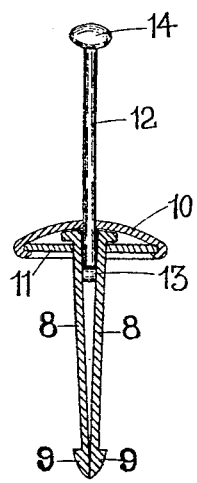
Figure 4:
Figure 5:
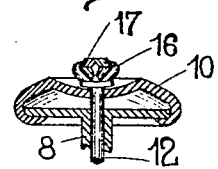

Figure 1 is a sectional view of the complete stud. Fig. 2 is a sectional view of the bottom or outer tubular part. Fig. 3 is a sectional view of the top or inner split part. Figs. 4 and 5 show modifications in the form of the head of the stud and locking-rod.

Like letters refer to similar parts throughout the views.

Referring first to Fig. 2, this bottom or outer portion consists of the hollow stem 1, broadening out into a base 2, formed as a retainer for a disk of pearl or other material 3 in the ordinary manner. The stem 1 has a flanged top edge 4 to form a temporary retainer for this part of the stud when inserted in the buttonhole or the like. The central hollow 5 of the stem 1 broadens into a larger hollow 6, as shown, and the stem has shoulders 7 7 formed thereon to act as a retainer for the top or inner split portion to be hereinafter described.

Referring now to Fig. 3, which forms the top or inner portion of the stud, the stem 8 is split, as shown, to form two sides having projections 9 9 thereon at the bottom. This stem is made of spring or other resilient metal and is normally in the position shown by Fig. 3, in which it will be observed that the two sides are in contact with each other, due to the method of construction and the aforesaid resilience, but are forced into the open or locking position by means of the central rod or pin 12, hereinafter described. The upper end of the stem 8 is engaged by a head 10, which may be of any suitable design, the one shown consisting of the convex piece 10 and the plate 11. This head has a hole in the center to form a guide for a central rod or pin 12. This rod has a flanged end 13 at the bottom and a knob or head 14. This central rod forms the locking means when the two parts of the stud or other fastener have been fitted together, as hereinafter described.

The action of this invention as applied to a stud is as follows: The bottom or outer portion, Fig. 2, is inserted in the buttonhole. The top or inner portion, Fig. 3, is now inserted within the other by pushing it down the hollow stem. When the top or inner portion has been pushed as far down as it will go, the central rod or pin 12, which was out at its full extent, as shown by Fig. 3, and which is limited by the shoulders 13 striking the connection of the split parts, is now pushed in, and this rod forces out the two sides of the stem 8, and consequently the projections 9 9 thereon, which are thus forced under the shoulders 7 7 and prevent the stud being disconnected until the rod 12 is withdrawn.

The complete stud is shown in its locked position in Fig. 1.

Fig. 4 shows a modified form of head, the knob 14 being replaced by a bar 15, which is easier to grip for pulling out the rod 12.

Fig. 5 shows the head of the rod or pin 12 formed as a claw 16 for retaining a stone or brilliant 17 and the head 10 of the stud recessed, which also facilitates the rod being gripped and prevents accidental withdrawal.

From the foregoing description it will be seen that I obtain a stud which can be easily inserted in the buttonhole and when in position locked by merely pushing in the rod 12, and obviously such rod could not be withdrawn by accident.

Having described my invention, what I claim, and desire to secure by Letters Patent, is—

1. A garment-fastener consisting of a hollow stem its inner walls terminating in shoulders, a bifurcated stem of resilient parts each part terminating in a shoulder at its inner end adapted to engage the shoulders of the hollow stem, a head on said bifurcated stem adapted to be seated upon the outer end of said hollow stem, a base for the latter, and a pin adapted to be inserted into the bifurcated stem to cause its shouldered ends to be opened and held in locked engagement with the shoulders of said hollow stem.

2. In dress or the like fasteners, the combination comprising a part, consisting of the hollow stem 1, having the interior shoulders 7, the broadened base 2, with a part, consisting of the bifurcated stem 8, having projections 9 at its inner end, the said bifurcated stem being held by the head 10 and the central rod or pin 12 having a retaining end 13 within the said top or inner part for the purpose of forcing the bifurcated stem under the shoulders 7 substantially as and for the purpose set forth.

In testimony whereof I have signed my name to this specification in the presence of two subscribing witnesses.

THOMAS HARRIS.

Witnesses
ALFRED WILLIAM BROWN,
AMY ROSINA MARLOW.